United States Patent [19]

Lisec

[11] Patent Number: 4,615,431
[45] Date of Patent: Oct. 7, 1986

[54] APPARATUS FOR CONVEYING PLATE- OR FRAME-SHAPED ELEMENTS

[76] Inventor: Peter Lisec, Bahnhofstrasse 34, 3363 Amstetten-Hausmening, Austria

[21] Appl. No.: 635,431

[22] Filed: Jul. 26, 1984

[30] Foreign Application Priority Data

Sep. 5, 1983 [AT] Austria .................................. 3164/83

[51] Int. Cl.$^4$ ............................................ B65G 37/00
[52] U.S. Cl. .............................. 198/468.6; 198/484.1
[58] Field of Search ............... 198/482, 488, 457, 626, 198/627, 614, 649, 468.6, 803.13, 484.1; 271/214, 903, 181

[56] References Cited

U.S. PATENT DOCUMENTS 2,848,124  8/1958  Angell et al. ..................... 198/482 X
3,567,003  3/1971  Towne et al. ........................ 198/488
3,926,298 12/1975  Miller et al. .
4,320,826  3/1982  Kramer et al. ................. 198/649 X
4,422,541 12/1983  Lisec ................................... 198/627

FOREIGN PATENT DOCUMENTS 370706  9/1982  Austria .
2728016  1/1979  Fed. Rep. of Germany .
2820630  1/1979  Fed. Rep. of Germany .

Primary Examiner—Joseph E. Valenza
Assistant Examiner—D. Glenn Dayoan
Attorney, Agent, or Firm—Young & Thompson

[57] ABSTRACT

An apparatus for conveying plate- or frame-shaped elements, especially unfinished insulating glass parts, with a storage area, comprises, between two conveying devices (1, 3) arranged offset with respect to each other and transporting the elements (6) in parallel to the plane defined by these elements, a transverse conveyor (2) transporting the elements (6) essentially transversely to their plane and lifters and strip-shaped members (13, 19) for transferring the elements (6) from one conveying device (1) to the transverse conveyor (2) and from the transverse conveyor (2) to the second conveying device (3).

8 Claims, 2 Drawing Figures

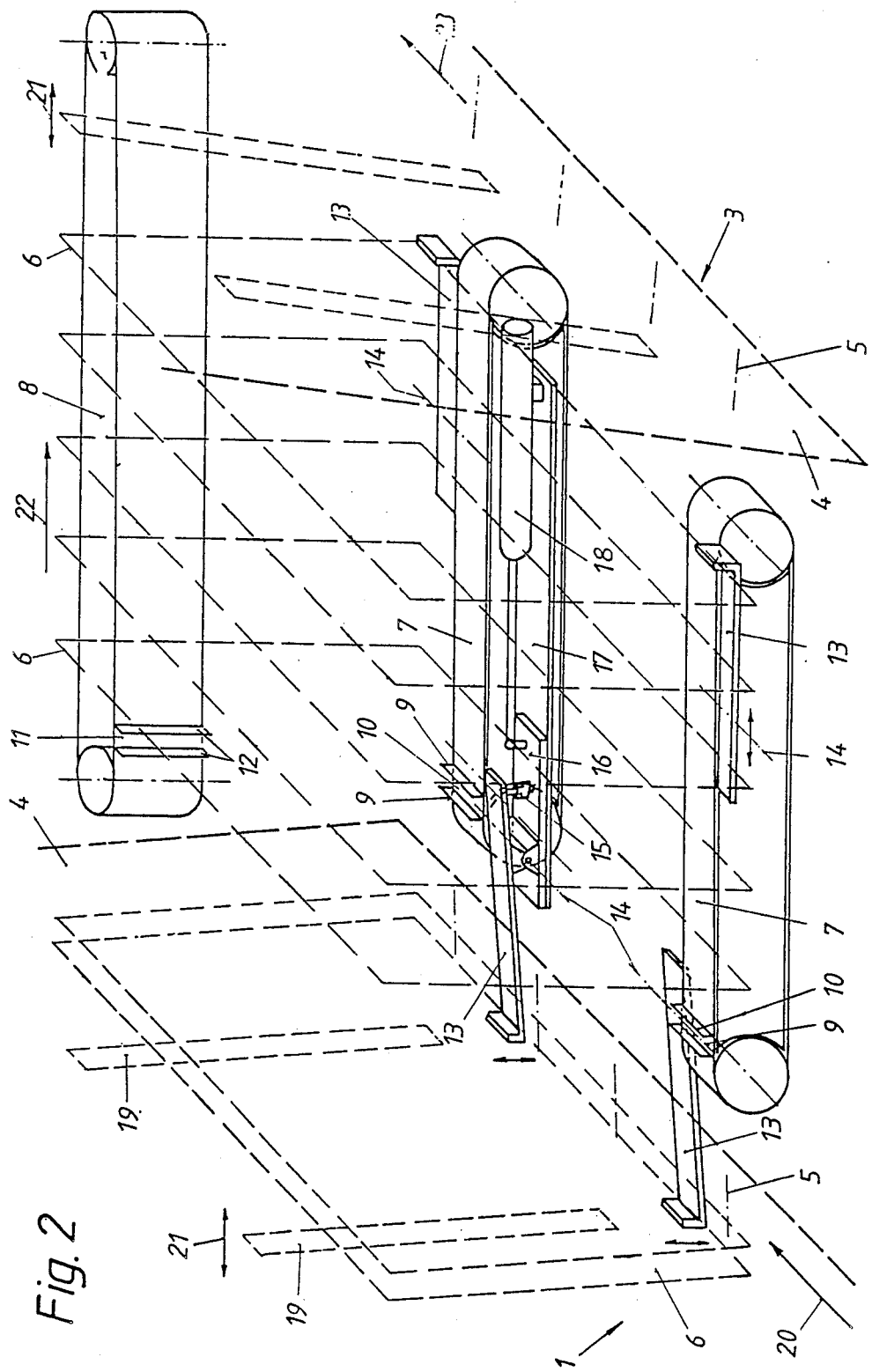

APPARATUS FOR CONVEYING PLATE- OR FRAME-SHAPED ELEMENTS

The invention relates to an apparatus for conveying plate- or frame-shaped elements, especially unfinished insulating glass parts, with a storage area.

During the course of processing plate- or frame-shaped elements, operating steps frequently occur which take a longer period of time than the remaining processing steps. This is true, inter alia, for the manufacture of insulating glass panes in fully automatic or semi-automatic production lines. Such production lines for insulating glass panes work normally with cycle periods of about 20 seconds. However, there are also working steps taking a longer period of time, such as, for example, filling the insulating glass blanks with a special gas (for example sulfur hexafluoride), for which purpose a time span of 2–3 minutes is required, depending on the size of the insulating glass blank.

The invention has for its object providing an apparatus of the type discussed above which, without impairing the total operating speed of the manufacturing line, also permits processing operations taking longer than the normal cycle time.

This is attained, according to this invention, in a device of the type described above by providing, between two conveying devices arranged offset with respect to each other and conveying the elements in parallel to the plane defined by these elements, a transverse conveyor transporting the elements substantially transversely to their plane; and by arranging means for transferring the elements from one conveying device to the transverse conveyor and from the transverse conveyor to the second conveying device.

In the apparatus of this invention, the plate- or frame-shaped elements, for example the unfinished insulating glass parts, can be supplied and again delivered with a normal cycle period (for example 20 seconds), but are available for a longer period of time in the storage area. The time span during which the plate- or frame-shaped elements are present in the storage area can be readily adapted to the respective requirements by the length of the transverse conveyor and/or by the conveying speed of the latter.

Another advantage of the apparatus of this invention resides in that the plate- or frame-shaped elements need neither be tilted nor turned but rather can essentially maintain the position occupied by them on the devices supplying them to the storage area and delivering them from the storage area. This is of special significance, in particular, in the manufacture of insulating glass blanks.

In one embodiment of the invention, the transverse conveyor comprises at least two conveying members engaging the lower edges of the substantially vertically disposed elements, and at least one conveyor engaging one of the substantially vertically aligned edges of the elements. This embodiment offers the advantage that the top edge and a vertical lateral edge of the elements to be processed are freely accessible for the processing operation to be performed while the elements are in the storage area.

In a practical embodiment of the invention, the conveying members associated with the bottom edges of the elements comprise endless conveyors carrying substantially U-shaped holders engaging the bottom edges of the elements.

In a preferred embodiment of the invention, the conveyor engaging the vertical lateral edge of the elements is an endless conveyor with holders that can be flipped away independently of one another and come in contact with the lateral faces of the elements. In this embodiment, the step of placing the vertical lateral edges of the frame-shaped or plate-shaped elements in engagement with the conveyor acting at that location is especially simple since the holders can be flipped away to effect engagement of the plate- or frame-shaped elements with the conveyor and can then be again flipped forward. The same applies to transferring the elements from the transverse conveyor to the conveying device transporting the elements away from the storage area.

According to another embodiment of the invention, the devices for transferring the elements comprise lifters engaging the bottom edges of the elements, which are displaceable and liftable in parallel to the conveying direction of the transverse conveyor, and members which are, for example, strip-shaped and can be moved out of the lateral supporting means for the elements transversely to the conveying direction of the conveying devices, and back again. The strip-shaped members which can be moved out of the lateral supporting means support the plate- or frame-shaped elements during transfer in their upper region until they have been placed in engagement with the holders of the conveyor. The same applies to transferring the elements from the end of the transverse conveyor to the second conveying device.

The invention also includes the feature that the lifters constitute hooks displaceable on guide rails in parallel to the conveying direction of the transverse conveyor and tiltable about essentially horizontal axes aligned transversely to the conveying direction of the transverse conveyor.

Transfer of the elements from the transverse conveyor to the second conveying device is especially simple if the conveyor engaging the vertical lateral edges of the elements has a conveying path extending farther toward the second conveying device than the conveying path of the conveying elements engaging the lower edges of the elements. This ensures that the elements, supported by the strip-shaped members swingable out of the lateral supporting means of the second conveying device, can be moved without problems into the rearwardly tilted position customary on the conveying devices.

Additional details and features of the invention can be seen from the following description of the practical example illustrated in the drawings wherein:

FIG. 2 shows the apparatus of FIG. 1 in a diagrammatic, greatly schematized perspective view.

Figure 1:
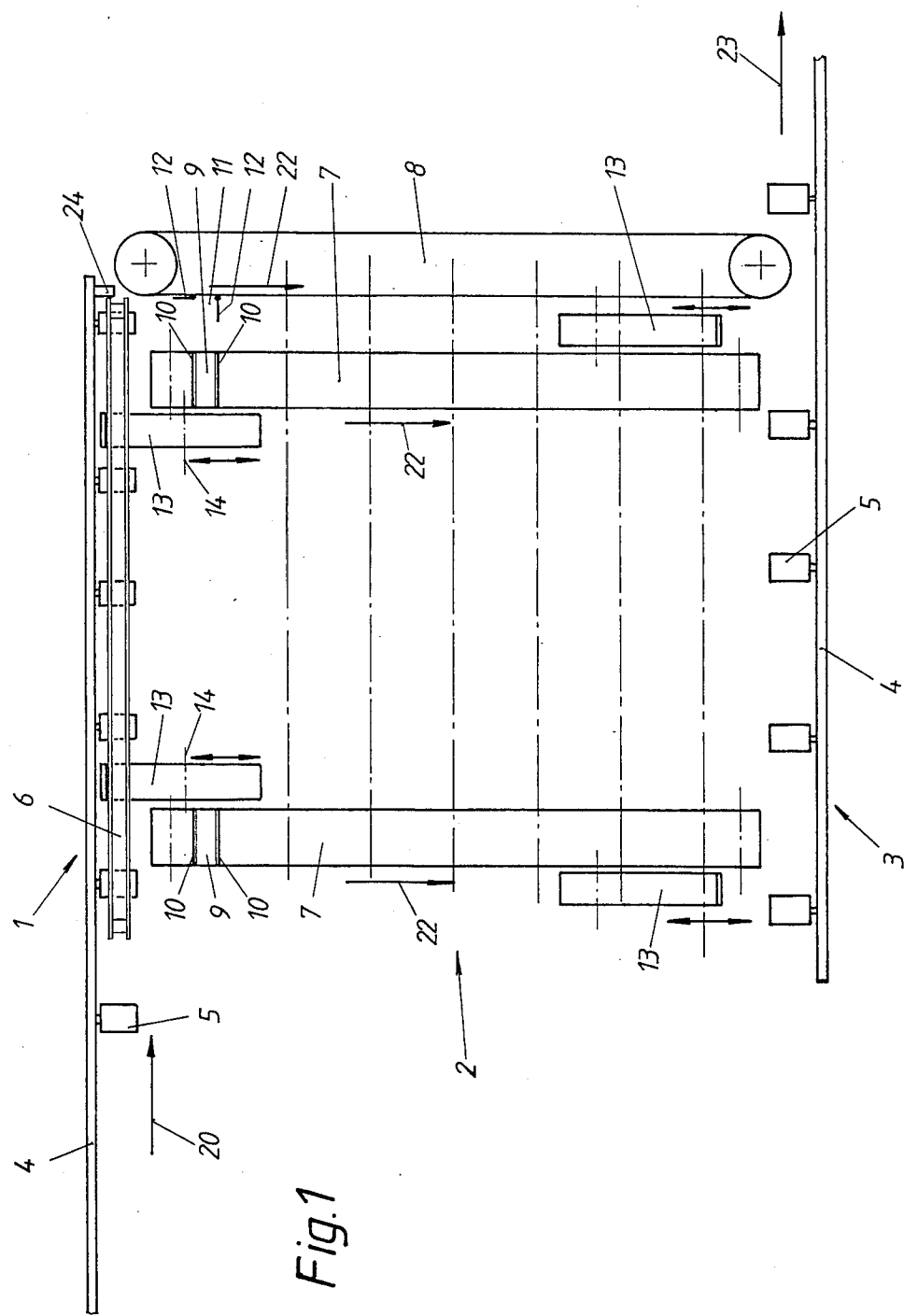
FIG. 1 shows an apparatus according to the invention in a top plan view.

The apparatus shown in FIG. 1 comprises a conveying device 1, a transverse conveyor 2 forming a storage area, and a further conveying device 3.

The conveying devices 1 and 3 can be constructed in a conventional fashion and exhibit, at the lower edge of a lateral supporting means 4, optionally driven rollers 5 on which the plate- or frame-shaped elements, such as, for example, an insulating glass blank 6 to be conveyed are supported. On the lateral supporting means 4 of the conveying devices 1 and 3, supporting rollers freely rotatable about vertical axes or horizontally movable, endless conveyor belts, not shown, are provided; alternatively, the lateral supporting means 4 are fashioned as sliding surfaces or air-cushion walls.

In the illustrated embodiment, the transverse conveyor 2 comprises two conveying members 7 and a conveyor 8. The conveying members 7, comprising, for example, endless conveyors, carry upwardly extending holders 9 attached to the conveyor segments and engaging the bottom edges of the elements 6; these holders are substantially U-shaped and have upwardly oriented flanks 10 contacting the lateral surfaces of the elements 6 in the region of the bottom edges.

The conveyor 8, engaging the vertical lateral edges of the elements 6, can likewise comprise an endless conveyor to which holders 11 are attached. The holders 11 comprise holding plates 12 which can be flipped independently of one another onto the conveyor belt or other conveying member of the conveyor 8; in FIG. 1, one holding plate 12 is flipped up.

The conveying members 7 and the conveyor 8 move discontinuously, i.e. stepwise, but at the same speed, the path of the conveyor 8 extending farther toward the conveying device 3 which transports the elements 6 away than does the path of the conveying members 7.

The conveying members 7 and the conveyor 8 are driven by motors not shown in detail, for example electric geared motors.

In order to transfer the elements 6 from the conveying device 1 to the transverse conveyor 2, two substantially hook-shaped lifters 13 are provided in the illustrated embodiment, making it possible to transfer the element 6, transported into the end position defined by a stop 24, from the conveying device 1 to the transverse conveyor 2. For this purpose, the lifters 13 can be pivoted about an axis 14 extending transversely to the conveying direction of the transverse conveyor 2, while lifting the element 6. A pressure medium cylinder 15 (FIG. 2) is provided for this purpose, for example.

After the element 6 has been lifted by the lifters 13 off the transporting rollers 5 of the conveying device 1, the lifters 13 are moved away from the conveying device 1. For this purpose, the lifters 13 are mounted on slides 16 (FIG. 2) sliding on a guide rail 17, fixed to the apparatus frame, under the action of a pressure medium cylinder 18.

Simultaneously with the movement of the lifters 13 away from the conveying device 1, strip-shaped members 19 tilt forward out of the lateral supporting means 4 of the conveying device 1 so that the element 6 retains during the step of being transferred to the transverse conveyor 2 its somewhat rearwardly tilted position which it occupies on the conveying device 1. The strip-shaped members 19 are moved forward and backward, respectively, in the direction of the double arrow 21, about horizontal axes arranged in the region of the lower end of the lateral supporting means 4 and extending in the conveying direction 20, by means of pressure medium motors, not shown in detail. As soon as the lower edge of the element 6 is located above the holders 9, the element 6 is set on the conveying members 7 by pivoting the lifters 13. Thereafter the strip-shaped members 19 urge the element 6, at the top, farther away from the conveying device 1 until the element is in contact, with its lateral edge, against the flipped-up plate 12 of the holder 11. Then the second or rear plate 12 of the holder 11 is flipped forward, and the transverse conveyor 2 is moved farther by one step in the direction of arrows 22.

Simultaneously with the transfer of an element 6 from the conveying device 1 to the transverse conveyor 2, an element 6 is transferred from the end of the transverse conveyor 2 to the conveying device 3 and then transported away in the direction of arrow 23. Transfer of an element 6 from the transverse conveyor 2 to the conveying device 3 takes place in analogous reversal of the afore-described steps when transferring an element 6 from the conveying device 1 to the transverse conveyor 2. Tilting of the elements 6 into their rearwardly tipped position assumed by the elements 6 on the conveying device 3 can be enhanced by providing that the conveyor 8 transports the elements 6 at the top more closely to the conveying device 3 than do the conveying members 7.

It can be seen from FIG. 2 that the top edges, and the vertical edges of the elements 6 opposite the conveyor 8, are freely accessible when the elements are moved by the transverse conveyor 2 from the conveying device 1 to the conveying device 3. It is thus possible without any problems to execute processing steps on the elements 6.

Although this is not illustrated in the drawings, embodiments having several conveyor members 7 and having a second conveyor 8 are likewise possible.

A very important feature of the present invention is that a storage area is created wherein the elements are disposed for a time period exceeding the normal cycle time of the total process, without thereby impairing the cycle period of the entire process.

What is claimed is:

1. Apparatus for conveying substantially vertically disposed plate- or frame-shaped elements such as unfinished insulating glass parts, comprising two conveying devices (1, 3) that are offset with respect to each other, which convey the elements (6) in parallel to the substantially vertical plane defined by said elements; a transverse conveyor (2) between said two conveying devices (1, 3) transporting said elements (6) substantially transversely to their substantially vertical plane, and means (13, 19) transferring the elements (6) from one said conveying device (1) to the transverse conveyor (2) and from the transverse conveyor (2) to the second said conveying device (3) while maintaining the elements (6) substantially vertical, the transverse conveyor (2) comprising at least two conveyor members (7) engaging the bottom edges of the substantially vertically disposed elements (6) and at least one conveyor (8) engaging one of the substantially vertically oriented edges of the elements (6) to stabilize the elements in the direction of conveyance, the conveyor (8) engaging the vertical lateral edge of the elements (6) being an endless conveyor parallel to said at least one conveyor and carrying holders (11, 12) that contact the lateral faces of the elements (6) with the elements (6) perpendicular to said endless conveyor.

2. Apparatus according to claim 1, in which the conveyor members (7) associated with the bottom edges of the elements (6) comprise endless conveyors carrying substantially U-shaped holders (9) engaging the bottom edges of the elements (6).

3. Apparatus according to claim 1, in which said holders (11, 12) can be swung between extended and retracted positions independently of one another.

4. Apparatus for conveying substantially vertically disposed plate- or frame-shaped elements such as unfinished insulating glass parts, comprising two conveying devices (1, 3) that are offset with respect to each other, which convey the elements (6) in parallel to the substantially vertical plane defined by said elements; a transverse conveyor (2) between said two conveying devices (1, 3), transporting said elements (6) substantially transversely to their substantially vertical plane, and means (13, 19) transferring the elements (6) from one said conveying device (1) to the transverse conveyor (2) and from the transverse conveyor (2) to the second said conveying device (3) while maintaining the elements (6) substantially vertical, the means transferring the elements (6) comprising lifters (13) engaging the bottom edges of the elements (6) and displaceable and liftable in parallel to the transverse conveyor (2), and members (19) which are strip-shaped and which are disposed within the carrying devices (1, 3) and which can be moved out of the conveying devices (1, 3) transversely to the conveying direction of the conveying devices (1, 3), and back again.

5. Apparatus according to claim 4, in which the strip-shaped members (19) can be swung out of lateral supporting walls (4) of the conveying devices (1, 3).

6. Apparatus according to claim 4, in which the lifters are constituted by hooks (13), guide rails (17) parallel to the transverse conveyor (2), on which said hooks are displaceably mounted, and means defining essentially horizontal axes (14) aligned transversely to the conveying direction of the transverse conveyor and about which said hooks are tiltable.

7. Apparatus according to claim 1, in which the conveyor (8) engaging the lateral edges of the elements (6) defines a first conveying path, and the conveyor members (7) engaging the bottom edges of the elements (6) define a second conveying path such that the first conveying path extends farther toward the second conveying device (3) than does the second conveying path.

8. Apparatus according to claim 1, and means driving the transverse conveyor (2) intermittently.

* * * * *